US008749104B2

(12) United States Patent
Smadja

(10) Patent No.: US 8,749,104 B2
(45) Date of Patent: Jun. 10, 2014

(54) ROTATING ELECTRIC MACHINE, ESPECIALLY SYNCHRONOUS PERMANENT MAGNET MACHINE

(75) Inventor: Charles Smadja, Toulouse (FR)

(73) Assignee: Alstom Renewable Technologies, Grenoble (FR)

( * ) Notice: Subject to any disclaimer, the term of this patent is extended or adjusted under 35 U.S.C. 154(b) by 459 days.

(21) Appl. No.: 13/095,387

(22) Filed: Apr. 27, 2011

(65) Prior Publication Data

US 2011/0266908 A1 Nov. 3, 2011

Related U.S. Application Data

(60) Provisional application No. 61/330,091, filed on Apr. 30, 2010.

(51) Int. Cl.
*H02K 21/14* (2006.01)

(52) U.S. Cl.
USPC ..................... 310/162; 310/216.112

(58) Field of Classification Search
USPC .............. 310/162, 164, 156.43–156.45, 206, 310/208, 216.111–216.112
See application file for complete search history.

(56) References Cited

U.S. PATENT DOCUMENTS

| | | | |
|---|---|---|---|
| 4,446,393 A * | 5/1984 | Finegold | 310/184 |
| 4,758,756 A | 7/1988 | Pouillange | |
| 5,973,431 A * | 10/1999 | Li et al. | 310/168 |
| 6,262,510 B1 | 7/2001 | Lungu | |
| 6,335,582 B1 * | 1/2002 | Abukawa et al. | 310/214 |
| 6,879,075 B2 | 4/2005 | Calfo et al. | |

FOREIGN PATENT DOCUMENTS

| | | |
|---|---|---|
| EP | 0158935 A1 | 10/1985 |
| EP | 0866547 A1 | 9/1998 |
| EP | 0872943 A1 | 10/1998 |
| EP | 2028744 A1 | 2/2009 |
| WO | 9011641 A1 | 10/1990 |

OTHER PUBLICATIONS

Kolletschke H-D, "Die modulare dauermagnetmaschine—Aufbaue und Eigenschaften (The modular permanent magnet machine—Assembly and properties)", Dissertation Von Der Fakultaet Fuer Elektrotechnik Deruniversitaet Der Bundeswehr Muenchen, XX, XX, Jan. 1, 1987, pp. 12-29, 64, XP002301888.

* cited by examiner

*Primary Examiner* — Tran Nguyen
(74) *Attorney, Agent, or Firm* — Buchanan Ingersoll & Rooney PC

(57) ABSTRACT

A rotating electric machine, especially synchronous permanent magnet machine, is provided. The machine includes a rotor with a given number of magnets distributed along the circumference and a given number of rotor pole pairs, and further comprising a stator with a given number of stator pole pairs and a given number of stator slots. The efficiency and the power of the machine are improved by making the number of stator pole pairs independent of the number of rotor pole pairs.

7 Claims, 2 Drawing Sheets

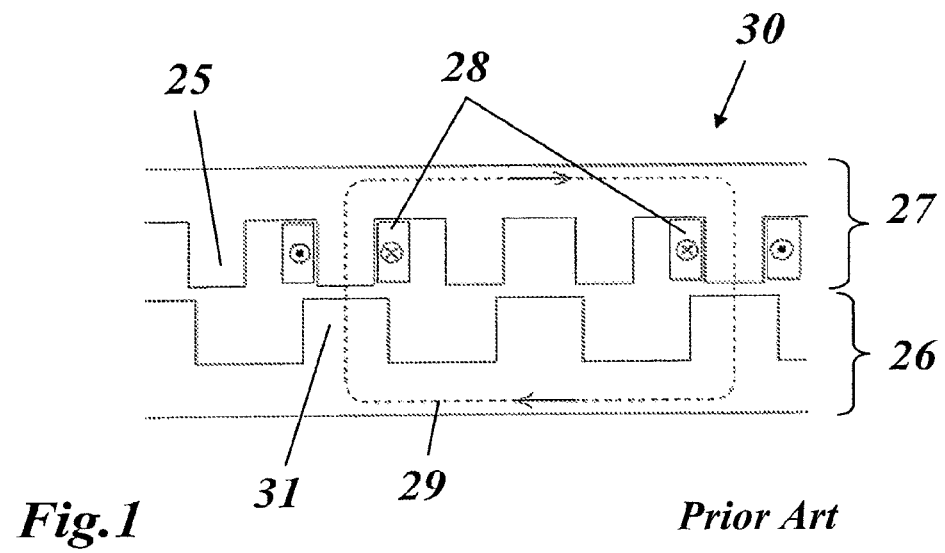
*Fig.1*  *Prior Art*
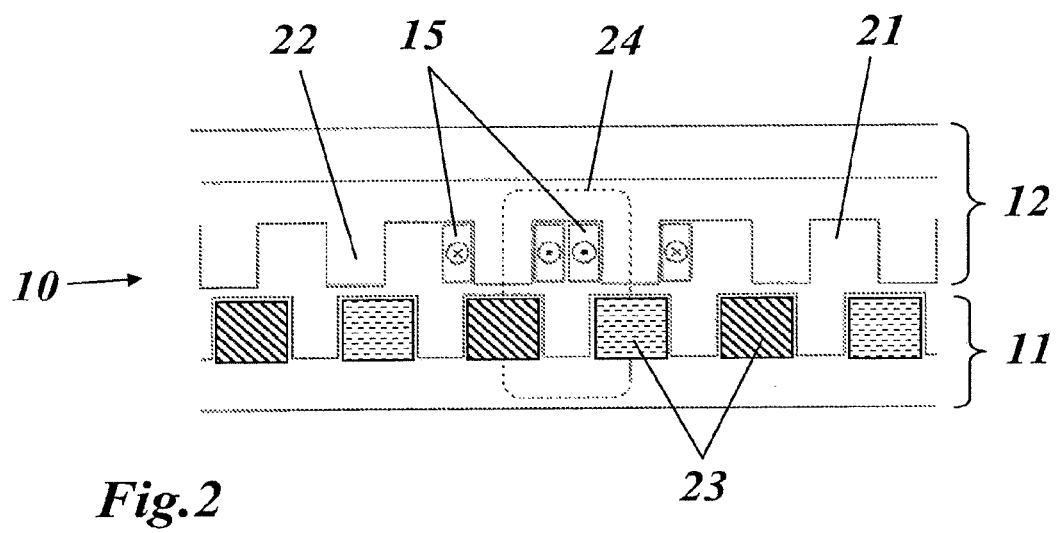
*Fig.2*

ROTATING ELECTRIC MACHINE, ESPECIALLY SYNCHRONOUS PERMANENT MAGNET MACHINE

CROSS REFERENCE TO RELATED APPLICATION

This application claims the benefit of U.S. Provisional Application No. 61/330,091, filed Apr. 30, 2010, the entire contents of all of which is incorporated by reference as if fully set forth.

FIELD OF INVENTION

The present invention relates to electric machines, in particular, it refers to rotating electric machines.

BACKGROUND

Permanent magnet (PM) generators are typically characterized by the following advantages: simple construction, high efficiency, high power factor and high power density. These types of generators are therefore well suited for direct-drive wind turbine applications (see for example EP 2 028 744).

There are several types of rotor topologies for PM synchronous generators. The configurations of the rotors can be divided into radial and transversal forms depending on the orientation of the magnetization direction of the permanent magnets. The transversal configuration is more suitable for applications requiring high power density and performance. The transversal-oriented magnet configuration is characterized by a partially non-magnetic rotor core with alternating transversal-oriented permanent magnets and pole pieces to concentrate the flux and direct it radially toward the stator teeth. The stator may be the same as in a conventional radial oriented magnet generator design (see U.S. Pat. No. 6,879,075).

As the output power of wind turbines has rapidly increased, the development of advanced generators has inherently involved the design and construction of large diameter and low speed machines. Over the past several years, high efficiency and lightweight generators using advanced magnetic materials have been developed. However, there is still a need for improvement of the generators to cope with the increasing power and efficiency requirements.

SUMMARY

The present disclosure is directed to a rotating electric machine. The machine includes a rotor with a given number of magnets distributed along a circumference thereof and a given number of rotor pole pairs. The machine also includes a stator with a given number of stator pole pairs and a given number of stator slots, the number of stator pole pairs is independent of the number of rotor pole pairs

BRIEF DESCRIPTION OF THE DRAWINGS

The present invention is now to be explained more closely by means of different embodiments and with reference to the attached drawings.

FIG. 1 shows a typical (long) magnetic flux path of a known Vernier machine;

FIG. 2 shows a (short) magnetic flux path in a machine according to an embodiment of the invention;

DETAILED DESCRIPTION OF THE PREFERRED EMBODIMENTS

Introduction To The Embodiments

It is an object of the present invention to build a rotating electric machine, which has a high efficiency and high power density and leads to an improved manufacturability of the stator coils and of the stator yoke or core.

This object is obtained by a rotating electric machine, comprising a rotor with a given number of magnets distributed along the circumference and a given number of rotor pole pairs, and further comprising a stator with a given number of stator pole pairs and a given number of stator slots, whereby the number of stator pole pairs is independent of the number of rotor pole pairs.

According to an embodiment of the invention the number $N_s$ of stator slots, the number $N_r$ of magnets and the number $p_s$ of stator pole pairs are connected by the equation $N_s = N_r \pm 2p_s$.

According to another embodiment of the invention the stator comprises a plurality of stator coils with each of said stator coils related to a phase of the machine, and the stator coils are separated from each other and are arranged in a series along the circumference of the stator.

According to another embodiment of the invention each of said stator coils comprises a plurality of adjacent single coils, each having an inner space to be put on a stator tooth, and each of said stator coils is wound in one piece from a single, continuous flat cable.

According to another embodiment of the invention said magnets are permanent magnets.

According to another embodiment of the invention the stator comprises a laminated stator core, and said laminated stator core is a stack of packets of laminations.

Preferably, each packet of laminations has a thickness of 10 mm-15 mm.

Detailed Description

Figure 3:
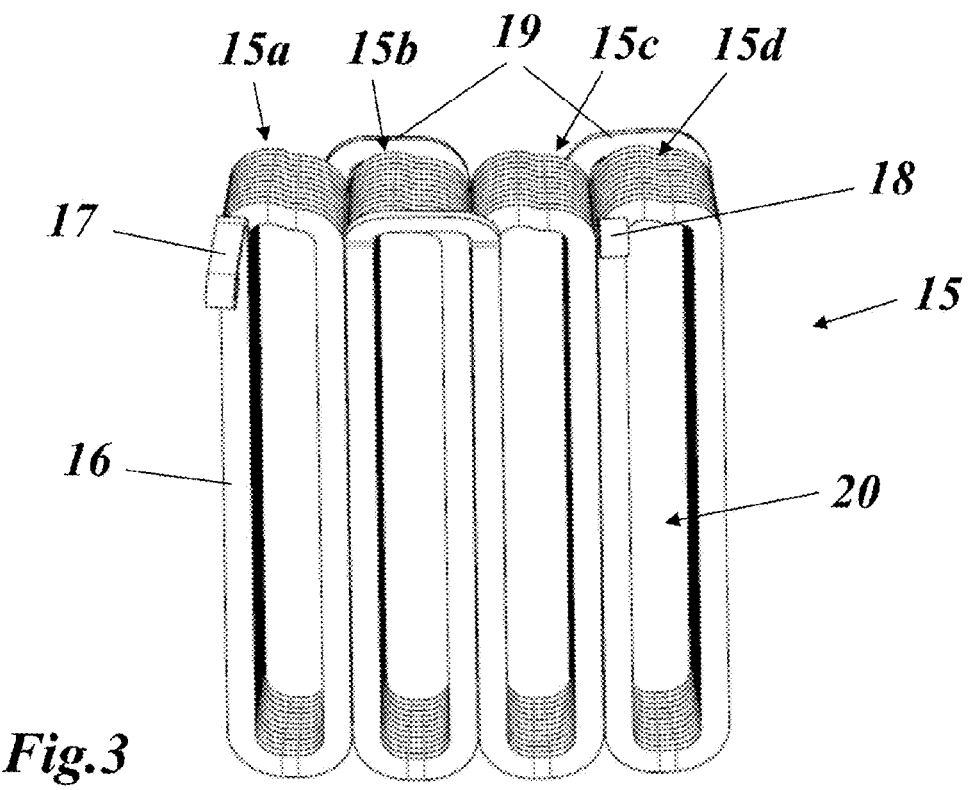
FIG. 3 shows a stator coil with a plurality of single coils, which may be used for a machine according to FIG. 2.
Figure 4:
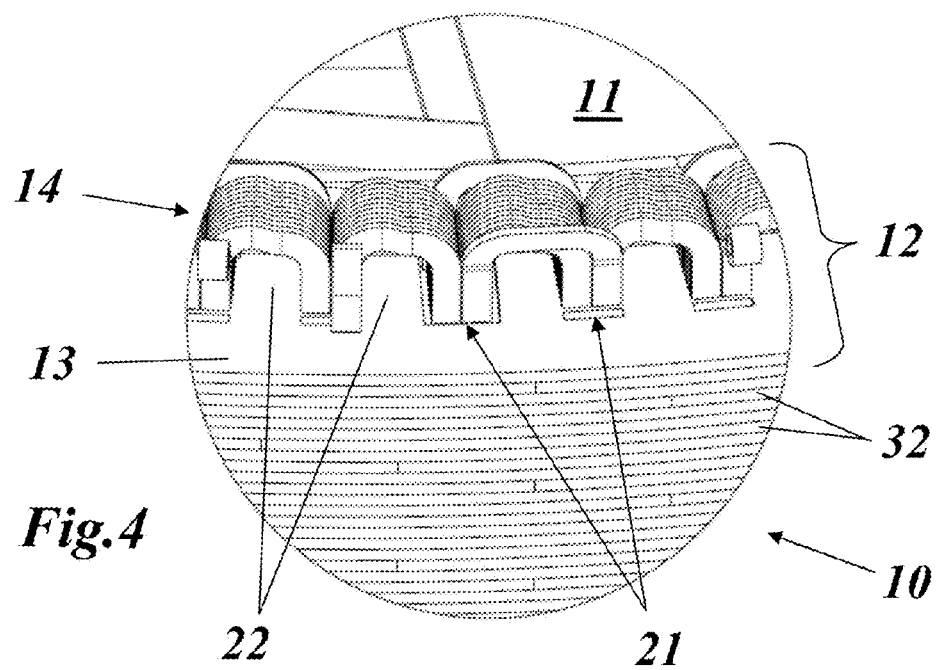
FIG. 4 shows the configuration of a machine with a coil similar to FIG. 3.

FIG. 4 shows part of a rotating electric machine 10, which may be used to put the invention into practice. The rotating electric machine 10 comprises a central rotor 11, which rotates around a central machine axis not shown. The rotor 11 is concentrically surrounded by a stator 12, which has a laminated stator core 13 made up of a plurality of lamination packets 32. At the inner circumference of the stator a plurality of radially oriented teeth 22 and slots 21 are distributed to receive a stator winding 14 comprising several stator coils 15 of the type shown in FIG. 3.

The permanent magnets on the rotor 11 are not shown in FIG. 4. They can be configured either with a radial or with a transverse field configuration. The stator coils 15 of the machine (generator) are preferably of the kind shown in FIG. 3. Each stator coil 15 is related to a phase of the machine. The stator coils 15 are separated from each other in the machine and are arranged in a series along the circumference of the stator 12. Each of said stator coils 15 comprises a plurality of adjacent single coils 15a-d, each having an inner space 20 to be put on a respective stator tooth 22. The single coils 15a-d are interconnected by interconnections 19. Each of said stator coils 15 is wound in one piece from a single, continuous flat cable 16. The interconnections 19 are arched sections of said cable 16. The stator coil 15 is further provided with connections 17 and 18 at its ends.

With the present invention, the number of rotor poles and the number of stator poles are defined independently from each other.

In conventional synchronous machines, the number of pole pairs p is defined by the rotation speed $\Omega_r$ ($\Omega_r=\omega/p$, where $\omega$ is the electrical pulsation, and p the number of pole pairs). The number of pole pairs p is then the same for the rotor and for the stator, otherwise the torque is null.

In electrical machines known as "Vernier machines" (see for example document U.S. Pat. No. 4,757,220), the stator pole number is different from the rotor pole number. A similar principle is used in the present invention, but the relation between the stator pole number and the rotor pole number is defined differently, leading to a higher efficiency, a higher power density, and a better manufacturability of the stator yoke.

According to the present invention, the number $p_r$ of rotor pole pairs and the number $p_s$ of stator pole pairs are defined in the following way:

The number of pole pairs p is still defined by the rotation speed $\Omega_r$:

$$\Omega_r=\omega/p,$$

where $\omega$ is the electrical pulsation, and p the number of pole pairs. As the rotation speed and the number of magnets are correlated through the following equation:

$$\Omega r=2\omega/Nr,$$

with $\omega$ being the electrical pulsation and $N_r$ being the number of magnets, the number of rotor pole pairs $p_r$ and the number of magnets $N_r$ are thus correlated by the following equation:

$$p_r=N_r/2.$$

The number of stator pole pairs $p_s$ is defined by the number of magnets $N_r$ and by the number of stator slots $N_s$ with the following equation:

$$N_s=N_r\pm 2p_s.$$

The number of stator pole pairs $p_s$ is thus independent from the number of rotor pole pairs $p_r$.

With the present invention, the number of stator poles has a marginal impact on the design except on the vibrations due to magnetic forces. An increase in stator pole number results in:

Reduced radial forces exerted by magnets on the stator teeth

Concurrently shortened, therefore stiffened, sector on which the forces are applied An additional parameter is available to fix vibration problems of the stator In the present invention, the number of stator poles and rotor poles are linked with the following formula (see above):

$$N_s=N_r\pm 2p_s.$$

In the Figures, it has been chosen: $p_s=1$ (and thus $N_s=N_r+2$ in accordance with the equation shown before).

The difference between a machine according to the present invention and a Vernier machine relates to the magnetic cycle of the permanent magnets (see in comparison FIGS. 1 and 2): In Vernier machines 30 half of the magnets (tooth 31) at the rotor 26 are in front of stator teeth 25 at the stator 27, whereas the other half are in front of the stator slots separating adjacent teeth 25 (see FIG. 1). Thus, at any time only half of the volume of the permanent magnets contributes to the torque of the machine. FIG. 1 shows the typical magnetic path of a Vernier machine 30. It has to be noted that only one stator phase is represented with its stator coil 28; the windings of the other phases would sit on the empty teeth 25. It can be easily seen, that the path of the magnetic flux 29 is quite long.

In the present invention all magnets contribute at any time, therefore resulting in a substantial saving in permanent magnets, which have among the highest material cost per unit weight. The mean to increase the permanent magnet utilization is to reduce the length of the magnetic path for the magnetic flux (24 in FIG. 2).

The shortest path for the magnetic flux going from one magnet to the magnet of opposed magnetization is shown in FIG. 2, where the rotating electric machine 10 has a rotor with alternating oriented permanent magnets 23 and a stator 12 with respective teeth 22 and slots 21 and a compact stator coil 15.

With the present invention the magnetic flux patterns of the different stator phases are separated (see FIG. 2), whereas in Vernier and conventional synchronous machines they are overlapping (see FIG. 1).

The iron losses may be reduced with this separated flux patterns, resulting in quite a marginal benefit in the foreseen application, because the iron losses are rather small.

The real benefit is not on the yoke but on the end-windings of the stator winding. Actually, the separation of magnetic flux comes along with a physical separation of the stator phases, which allows avoiding crossings of conductors of the stator winding in the end-winding.

Due to the separation of the phases, stator coils 15 as shown in FIG. 3, which are wound from a single continuous flat cable 17 and comprise each a plurality of single coils 15a-d to sit on respective teeth, can thus advantageously be used in this machine.

An additional benefit of the short length flux pattern (see 24 in FIG. 2) is that the yoke or laminated stator core 13 can be constituted of segments, as very often used when stacking yokes of large synchronous machines, without having additional losses from the flux crossing the azimuthal gap between the laminations, and provided that this gap is located in the middle of a tooth.

As a consequence, the stacking of the yoke can be done by packets of laminations 32, which are for instance 10 mm-15 mm thick. The only limitation is due to the weakening of mechanical properties of the yoke if very thick packets are stacked. The benefit is a simplification of the handling of the laminations, which can be done by packets and not individually, and of the stacking process.

| LIST OF REFERENCE NUMERALS | |
|---|---|
| 10 | rotating electric machine |
| 11 | rotor |
| 12 | stator |
| 13 | laminated stator core |
| 14 | stator winding |
| 15 | stator coil |
| 15a-d | single coil |
| 16 | cable (flat) |
| 17, 18 | connection |
| 19 | interconnection |
| 20 | inner space |
| 21 | slot (stator) |
| 22 | tooth (stator) |
| 23 | permanent magnet |
| 24 | magnetic flux |
| 25 | tooth (stator) |
| 26 | rotor |
| 27 | stator |
| 28 | stator coil |
| 29 | magnetic flux |

-continued

LIST OF REFERENCE NUMERALS

| 30 | Vernier machine |
| 31 | tooth (rotor) |
| 32 | packet of laminations |

What is claimed is:

1. Rotating electric machine comprising;
a rotor with a number ($N_r$) of magnets distributed along a circumference thereof and a number ($p_r$) of rotor pole pairs; and
a stator with a number ($p_s$) of stator pole pairs and a number ($N_s$) of stator slots;
wherein the number ($N_s$) of stator slots, the number ($N_r$) of magnets and the number ($p_s$) of stator pole pairs are related by an equation; $N_s = N_r \pm 2p_s$.

2. Rotating electric machine according to claim 1, wherein the stator comprises a plurality of stator coils with each of said stator coils related to a phase of the machine, and the stator coils are separated from each other and are arranged in a series along the circumference of the stator.

3. Rotating electric machine according to claim 2, wherein each of said stator coils comprises a plurality of adjacent single coils, each having an inner space to be put on a stator tooth, and each of said stator coils is wound in one piece from a single, continuous flat cable.

4. Rotating electric machine according to claim 1, wherein said magnets are permanent magnets.

5. Rotating electric machine according to claim 1, wherein the stator comprises a laminated stator core, and said laminated stator core is a stack of packets of laminations.

6. Rotating electric machine according to claim 5, wherein each packet of laminations has a thickness of 10 mm-15 mm.

7. Rotating electric machine according to claim 1, wherein the machine is a synchronous permanent magnet machine.

* * * * *